Patented July 30, 1935

2,009,435

UNITED STATES PATENT OFFICE 2,009,435

NONCAKING PIGMENT

Cole Coolidge and Harold Stephens Holt, Wilmington, Del., assignors, to E. I. du Pont de Nemours & Company, Wilmington, Del., a corporation of Delaware No Drawing. Application March 16, 1932, Serial No. 599,335

20 Claims. (Cl. 134—58)

This invention relates to non-caking pigments and to a method of treating pigments and, more particularly, to a method of providing a protective film on individual pigment particles in order to prevent caking of the pigment in various coating compositions. The present invention is a continuation-in-part of applicants' copending application Serial No. 278,909, filed May 18, 1928, non-caking pigmented coating compositions which issued as Patent No. 1,863,834.

It is desirable first to comment briefly upon the behavior of certain pigments in prior art coating compositions in regard to the phenomenon known as "caking". As pigmented coating compositions have been ordinarily prepared, the pigments have been distributed or dispersed in the coating compositions by various means to a degree satisfactory from a practical standpoint, as far as the immediate condition of the composition is concerned, but, after standing for a period of time, such compositions have exhibited a tendency for the sedimentation of the pigment, this process or phenomenon developing eventually to the point where the pigment became massed and tough with the ageing of the composition, so that finally a hardness and dryness of the pigment took place, which made it very difficult to reincorporate the pigment in the composition to the same condition of dispersion that had originally existed. In some cases the cake so formed could be redispersed to a degree where the composition would be in condition for use, but this operation required expenditure of energy and time, and as a rule, it was difficult to attain the original degree of dispersion without resorting to regrinding.

Experience has shown that frequently a comparatively large percentage of the pigment could not readily be redispersed owing to an insufficient degree of stirring, with a resulting quality unsatisfactory to the consumer. A decreased quality resulted in that the covering power was decreased, lumpy particles were present in the film, and off-tints in the case of light colors were encountered. Such a condition existing in paint type products represented definitely undesirable qualities, while in low viscosity lacquer type products, such as brush lacquers, etc., it has constituted a serious and objectionable feature. The tendency to hard-cake in the manner set forth varies with the pigment and also with the vehicle. It has been found that in certain instances it is possible to select for a given vehicle certain pigments which do not hard-cake to an extreme degree in the normal life of a shelf product, but this is not always a matter of free choice, as it is often necessary to use pigments with definite hard-caking tendencies in order to obtain certain necessary or desirable characteristics in the final products. Such a case may be illustrated by the more highly pigmented lacquers, such as whites and light shades, the latter representing tinted white in most cases. The combination of high density pigment or a pigment of an abnormal hard-caking tendency, with a low viscosity nitrocellulose vehicle, represents a system which frequently develops a maximum in hard-caking, this objectionable property being produced to a degree which is worse than in most enamel and paint products of the prior art. The importance of hiding power, the highly uniform surface character, and the necessity for close matches in tint render the off-quality characteristics imparted by hard-caking particularly serious in the case of lacquer type products.

On the other hand, some paint and lacquer compositions do not develop hard-caking owing to the peculiar nature of the systems involved, but nevertheless this hard-caking phenomenon has been frequently experienced in many kinds of prior art formulations for paints, lacquers, enamels, et cetera.

It will be clear from this discusstion that we are not discussing a mere sedimentation or temporary deposition of pigment particles that can be easily remedied by stirring, but we are rather referring to a result of deposition or settling of particles which results in the formation of a hard cake that is most difficult to reincorporate with the vehicle and which, generally speaking, exhibits the characteristics of toughness, hardness, and resistance to stirring and reincorporation in the vehicle.

An object of the present invention is to provide a non-caking pigment whereby the difficulties discussed above may be eliminated. A further object of the invention is to provide a simple and economical method of treating pigments to give them non-caking properties. A more specific object is to provide a non-caking titanium oxide pigment.

The above objects are accomplished according to the present invention by depositing a film of a protective agent from the group consisting of rubber, rubber latex, balata, and gutta percha on the individual particles of the pigment mass.

The following examples are given to illustrate preferred specific embodiments of the invention, parts being given by weight:

*Example 1.*—Five parts of a composite pigment consisting of about 25% titanium oxide and 75% barium sulphate (known under the trade name of "Titanox") were thoroughly mixed with 1 part of a 5% solution of rubber in gasoline. Additional rubber solvent or diluent may be added. After mixing sufficiently to obtain a uniform incorporation of the rubber in the pigment mass, the mixture was dried and the resulting pigment was ready for use in the usual manner in preparing coating compositions.

In the event that the pigment mass as made above should become aggregated or lumpy it may be ground in any suitable grinding apparatus, such as a pebble mill, to reduce it to appropriate fineness. Other rubber solvents, such as mineral spirits, benzene, carbon disulphide, chloroform, naphtha, carbon tetrachloride, and the like, may be used in place of gasoline. An alternative method of procedure is to dry mill the pigment with the rubber without the use of any rubber solvent or diluent.

Example 2.—One part of the composite pigment used in Example 1 was slurried with three parts of water. To the slurry was added with strong agitation a small amount of an aqueous solution of rubber latex, the rubber amounting to 0.5% to 1.0% based on the weight of the pigment. The mixture was agitated thoroughly to allow for uniform absorption or incorporation of the rubber on the pigment. The pigment was then filtered and dried and was then ready for use in the normal manner of preparing coating compositions.

The above examples have been given to specifically illustrate the invention, which includes within its scope the use of gutta percha, or balata, as well as rubber or rubber latex, as the protective agent.

The solvent or dispersion medium should preferably be one simple liquid or a mixture of such, containing no substance which might inhibit adsorption or deposition of the protective agent on the pigment. The agent will be used in quantity to form a film, let us say, of at least molecular dimensions on the pigment particles. The agent is incorporated with the pigment by thorough mixing and agitation of the pasty mass whereby all pigment particles are brought into intimate contact with the protective agent. In certain systems of necessarily heavy consistency it may be necessary to substitute for this mixing operation a grinding procedure. The said deposition of the agent on the pigment particles has the effect of separating the particles and thereby avoids caking when incorporated in a coating composition vehicle. The solvent may be partially or completely removed by filtration or evaporation after the agent is incorporated.

The invention is applicable not only to pigments such as a complex titanium pigment containing titanium oxide and barium or calcium sulphate in approximately the proportion of 25% titanium oxide and 75% metal sulphate, but is applicable to pigments generally, being of more value, naturally, in connection with pigments showing marked caking qualities, as for example, the titanium oxide pigments. Among other pigments suitable for use in the present invention may be mentioned lithopone, iron oxide, barium sulphate, chrome green, whiting, basic carbonate white lead, or admixtures of any of these.

The proportion of protective agent to pigment may be varied considerably, although experience has shown that a proportion of 0.5% to 1.0% of the protective agent, based on the weight of the pigment, is preferred. Nevertheless, in many instances as little as 0.25% of the protective agent, based on the weight of the pigment, is sufficient to give a pigment of superior non-caking properties.

Pigments treated in accordance with the present invention may be used in the normal manner in all types of coating compositions including paints, varnishes, and cellulose derivative lacquers. It has been found that, although the treated pigment may settle to the bottom of the can where the coating composition has been stored for a long period of time, it will not form a hard cake in the bottom of the can but, on the contrary, may be easily and uniformly dispersed throughout the liquid vehicle by a simple stirring, whereas untreated pigments under the same conditions will form a hard cake in the bottom of the can which cannot be satisfactorily dispersed throughout the liquid vehicle again.

The term "titanium oxide pigment" as used herein is intended to include pigments containing titanium oxide whether alone, in physical admixture with other pigments, or in chemical combination, and the term "rubber" as used in the claims is intended to include not only what is technically known as rubber (either milled or raw), but also the rubber-like products known as Thermoprene S L and G P obtained by heating rubber with organic sulfonyl chloride or organic sulphonic acid in a gasoline medium.

As many apparently widely different embodiments of this invention may be made without departing from the spirit thereof, it is to be understood that the invention is not to be limited to the foregoing examples or description except as indicated in the following patent claims.

We claim:

1. Method of treating a pigment mass to give it non-caking properties which comprises mixing the pigment mass with from 0.25% to 1.0% of a protective agent, based on the weight of the pigment mass, dispersed in a liquid medium, said protective agent being selected from the group consisting of rubber, rubber latex, balata and gutta percha, whereby a film of said protective agent is deposited on the individual pigment particles, and drying said pigment mass.

2. Method of treating a pigment mass to give it non-caking properties which comprises mixing the pigment mass with from 0.5% to 1.0% of a protective agent, based on the weight of the pigment mass, dispersed in a liquid medium, said protective agent being selected from the group consisting of rubber, rubber latex, balata and gutta percha, whereby a film of said protective agent is deposited on the individual pigment particles, and drying said pigment mass.

3. Method of treating a titanium oxide pigment mass to give it non-caking properties which comprises mixing the titanium oxide pigment mass with from 0.25% to 1.0% of a protective agent, based on the weight of the pigment mass, dispersed in a liquid medium, said protective agent being selected from the group consisting of rubber, rubber latex, balata and gutta percha, whereby a film of said protective agent is deposited on the individual pigment particles, and drying said pigment mass.

4. Method of treating a titanium oxide pigment mass to give it non-caking properties which comprises mixing the titanium oxide pigment mass with from 0.5% to 1.0% of a protective agent, based on the weight of the pigment mass, dispersed in a liquid medium, said protective agent being selected from the group consisting of rubber, rubber latex, balata and gutta percha, whereby a film of said protective agent is deposited on the individual pigment particles, and drying said pigment mass.

5. A non-caking, substantially dry pigment mass in finely divided form, the individual particles of which have a film on their surfaces of a protective agent from the group consisting of rubber, rubber latex, balata and gutta percha, the protective agent amounting to from 0.25% to 1.0% based on the weight of the pigment mass.

6. A non-caking, substantially dry pigment mass in finely divided form, the individual particles of which have a film on their surfaces of a protective agent from the group consisting of rubber, rubber latex, balata and gutta percha, the protective agent amounting to from 0.5% to 1.0% based on the weight of the pigment mass.

7. A non-caking, substantially dry titanium oxide pigment mass in finely divided form, the individual particles of which have a film on their surfaces of a protective agent from the group consisting of rubber, rubber latex, balata and gutta percha, the protective agent amounting to from 0.25% to 1.0% based on the weight of the pigment mass.

8. A non-caking, substantially dry titanium oxide pigment mass in finely divided form, the individual particles of which have a film on their surfaces of a protective agent from the group consisting of rubber, rubber latex, balata and gutta percha, the protective agent amounting to from 0.5% to 1.0% based on the weight of the pigment mass.

9. Method of treating a pigment mass to give it non-caking properties which comprises mixing the pigment mass with from 0.5% to 1.0% of rubber, based on the weight of the pigment mass, dispersed in a liquid medium, whereby a film of said protective agent is deposited on the individual pigment particles, and drying said pigment mass.

10. Method of treating a titanium oxide pigment mass to give it non-caking properties which comprises mixing the titanium oxide pigment mass with from 0.5% to 1.0% of rubber, based on the weight of the pigment mass, dispersed in a liquid medium, whereby a film of said protective agent is deposited on the individual pigment particles, and drying said pigment mass.

11. A non-caking, substantially dry pigment mass in finely divided form, the individual particles of which have a film on their surfaces of rubber in an amount from 0.5% to 1.0%, based on the weight of the pigment mass.

12. A non-caking, substantially dry titanium oxide pigment mass in finely divided form, the individual particles of which have a film on their surfaces of rubber in an amount from 0.5% to 1.0%, based on the weight of the pigment mass.

13. Method of treating a pigment mass to give it non-caking properties which comprises mixing the pigment mass with from 0.5% to 1.0% of rubber latex, based on the weight of the pigment mass, dispersed in a liquid medium, whereby a film of said protective agent is deposited on the individual pigment particles, and drying said pigment mass.

14. Method of treating a titanium oxide pigment mass to give it non-caking properties which comprises mixing the titanium oxide pigment mass with from 0.5% to 1.0% of rubber latex, based on the weight of the pigment mass, dispersed in a liquid medium, whereby a film of said protective agent is deposited on the individual pigment particles, and drying said pigment mass.

15. A non-caking, substantially dry pigment mass in finely divided form, the individual particles of which have a film on their surfaces of rubber latex in an amount from 0.5% to 1.0%, based on the weight of the pigment mass.

16. A non-caking, substantially dry titanium oxide pigment mass in finely divided form, the individual particles of which have a film on their surfaces of rubber latex in an amount from 0.5% to 1.0%, based on the weight of the pigment mass.

17. Method of treating a lithopone pigment mass to give it non-caking properties which comprises mixing the lithopone pigment mass with from 0.25% to 1.0% of rubber, based on the weight of the pigment mass, dispersed in a liquid medium, whereby a film of said protective agent is deposited on the individual pigment particles, and drying said pigment mass.

18. A non-caking, substantially dry lithopone pigment mass in finely divided form, the individual particles of which have a film on their surfaces of rubber in an amount from 0.25% to 1.0%, based on the weight of the pigment mass.

19. Method of treating a lithopone pigment mass to give it non-caking properties which comprises mixing the lithopone pigment mass with from 0.5% to 1.0% of rubber, based on the weight of the pigment mass, dispersed in a liquid medium, whereby a film of said protective agent is deposited on the individual pigment particles, and drying said pigment mass.

20. A non-caking, substantially dry lithopone pigment mass in finely divided form, the individual particles of which have a film on their surfaces of rubber in an amount from 0.5% to 1.0%, based on the weight of the pigment mass.

COLE COOLIDGE.
HAROLD S. HOLT.